United States Patent [19]

Ishikawa et al.

[11] Patent Number: 4,954,681

[45] Date of Patent: Sep. 4, 1990

[54] DRYING AND CRYSTALLIZING APPARATUS FOR GRANULES, WHICH EMPLOYS A MICROWAVE DEVICE

[75] Inventors: Kanzo Ishikawa, Uji; Ryutaro Hayashi, Mino; Akira Yoshimoto, Sakai, all of Japan

[73] Assignee: Kawata Co., Ltd., Osaka, Japan

[21] Appl. No.: 330,783

[22] Filed: Mar. 30, 1989

[30] Foreign Application Priority Data

May 31, 1988 [JP] Japan ................................ 63-134895
Jun. 30, 1988 [JP] Japan ................................ 63-164177

[51] Int. Cl.⁵ .......................... H05B 6/78; B29B 13/08
[52] U.S. Cl. ...................... 219/10.55 A; 219/10.55 F; 34/1; 34/4; 366/224; 366/228
[58] Field of Search ............... 219/10.55 A, 10.55 F, 219/10.55 R, 10.55 E; 34/1, 4, 108, 109, 110, 185, 132, 133; 366/224, 225, 228, 229, 230

[56] References Cited

U.S. PATENT DOCUMENTS

| | | | |
|---|---|---|---|
| 1,910,263 | 5/1933 | Seyffert ............................. | 366/229 |
| 3,090,602 | 5/1963 | Benton ............................. | 366/229 X |
| 3,216,345 | 11/1965 | Rigby et al. ..................... | 366/225 X |
| 3,595,534 | 7/1971 | Burton ............................. | 366/225 |
| 3,777,095 | 12/1973 | Muranaka ..................... | 219/10.55 A |
| 4,406,937 | 9/1983 | Soulier ......................... | 219/10.55 A |
| 4,565,670 | 1/1986 | Miyazaki et al. ............. | 219/10.55 A |
| 4,664,924 | 5/1987 | Sugisawa et al. ............. | 219/10.55 A |
| 4,771,156 | 9/1988 | Strattan et al. ............... | 219/10.55 M |

FOREIGN PATENT DOCUMENTS 62-222679 12/1987 Japan .
1-163007 6/1989 Japan .

Primary Examiner—Philip H. Leung
Attorney, Agent, or Firm—Stevens, Davis, Miller & Mosher

[57] ABSTRACT

A drying and crystallizing apparatus for granules, which is provided in a heating tank formed in the shape of a rectangular parallelepiped with a plurality of spaced-apart disc-like partitions forming therebetween a plurality of partitioned spaces across a material inlet and a material outlet, the partitions being rotatably suppported on a rotary shaft and provided with agitating vanes respectively, so that the granules are heated efficiently and uniformly by use of a microwave unit without heating variations, thereby enabling the granules to be dried or crystallized in a short time.

7 Claims, 2 Drawing Sheets

DRYING AND CRYSTALLIZING APPARATUS FOR GRANULES, WHICH EMPLOYS A MICROWAVE DEVICE

FIELD OF THE INVENTION

The present invention relates to a drying and crystallizing apparatus for granules, and more particularly to a drying and crystallizing apparatus for granules which are formed mainly of synthetic resin.

BACKGROUND OF THE INVENTION

Conventionally, granules of synthetic resin are dried, or those of petrochemical resin of crystalline synthetic resin are crystallized, in manner such that usually a sealed processing tank is used and the granules charged therein are supplied with hot air from below.

In this case, when the temperature of the material becomes higher than a predetermined level, additional granules are softened and mutually fused to make difficult uniform hot-air-drying, or are oxidized at the surface, whereby they are not usable as molding material. Hence, the granules must be dried by hot air at a lower temperature than the predetermined level, thereby creating the problem in that additional time is required to that extent for drying them.

The present invention relates to granules including a water content which are heated from the interior by microwaves, so that such heating is convenient for dispersing the water content in the granules onto the surfaces thereof. The technique includes a granule drying and crystallizing apparatus which can dry or crystallize the granules in a short time by using the microwaves. The above idea is the subject of Japanese Patent Application No. Sho 62-314920 of the present invention.

Such internal heating is very efficient, but has a problem in that variation is caused in the heating of granules in the processing tank. The problem is remedied at one side in manner such that the granules are agitated by rotation of vanes provided in the processing tank. The use of such usual agitating vanes, however, results in a non-uniform residence time of granules in the processing tank, in other words, the time of microwave-heating the granules while staying in the tank, thereby creating a problem in that variation in the heating still results.

On the other hand, the heating by the microwaves is efficient to quickly reach the temperature of drying the granules, whereby they are heated prior to being dried by vaporizing the water content. As a result, the radiation of the microwaves must often be interrupted so as not to fuse the granules due to an excessive high temperature during the drying step. Accordingly, a problem also is created in that an expensive microwave apparatus is idle during part of the process without a full operation, which is very uneconomical.

SUMMARY OF THE INVENTION

A main object of the invention is to provide a drying and crystallizing apparatus for granules, which eliminates non-uniform heating caused by irregular reflection of microwaves and variation in the residence time of granules in the processing tank so that the granules mainly of synthetic resin can be heated by the microwaves, thereby performing continuouly uniform drying or crystallization.

Another object of the invention is to provide an inexpensive drying apparatus for granules, which can improve an operating rate and reduce a drying time.

The present invention is characterized in that the drying and crystallizing apparatus for granules is provided with (1) a heating tank formed in the shape of a rectangular parallelepiped and having at one lengthwise side a material inlet and at the other lengthwise side a material outlet and with a microwave unit for radiating microwaves onto the granules charged in the heating tank, (2) a plurality of disc-like partitions disposed across the material inlet and material outlet at the heating tank to form a plurality of partitioned spaces between the respective adjacent partitions, and (3) agitating vanes at each partition, which agitate the granules in the partitioned spaces between the respective partitions and transfer them to the adjacent space at the material outlet side.

A driving shaft disposed at the heating tank rotates to allow the vanes to agitate the granules within the spaces between the partitions, so that even when the microwaves radiated from the microwave units are irregularly reflected in the heating tank, no variation is caused in heating the granules, and since the granules in each space are sequentially transferred by rotation of the agitating vanes toward the adjacent space at the material outlet side, variation in the residence time of the granules subjected to the microwave heating in the heating tank is eliminated. Accordingly, the microwaves radiate onto the synthetic resin granules continuously charged in the heating tank, thereby enabling the entire granules to be uniformly and continuously dried and crystallized.

The present invention is further characterized in that separately from a sealed heating tank having the material inlet and outlet and provided with a microwave unit, a sealed drying tank is provided which has a material inlet and a material outlet and is provided with a diffuser for dehumidifying air from a dehumidifying air feeder, and between the material output of the heating tank and the material inlet of the drying tank is provided connecting means for connecting the heating tank and drying tank, so that the granules heated by the heating tank are dried in the drying tank.

The granules charged in the heating tank through the material inlet are quickly heated up to an optinmum temperature to dry them by radiating the microwaves, the heated granules being discharged from the material outlet without waiting for drying, charged into the separate drying tank through the connecting means, and dried in the drying tank by the dehumidifying air from the dehumidifying air feeder. Hence, the drying capacity of the drying tank corresponds to the heating capacity of the heating tank, so that the microwave unit can always demonstrate its capacity without interrupting application of the microwave radiation, thereby improving its operating rate and enabling the granules to be continuously dried.

The above and further objects and novel features of the invention will be more fully apparent from the following detailed description when the same is read in connection with the accompanying drawings.

DETAILED DESCRIPTION OF THE INVENTION

Figure 1:
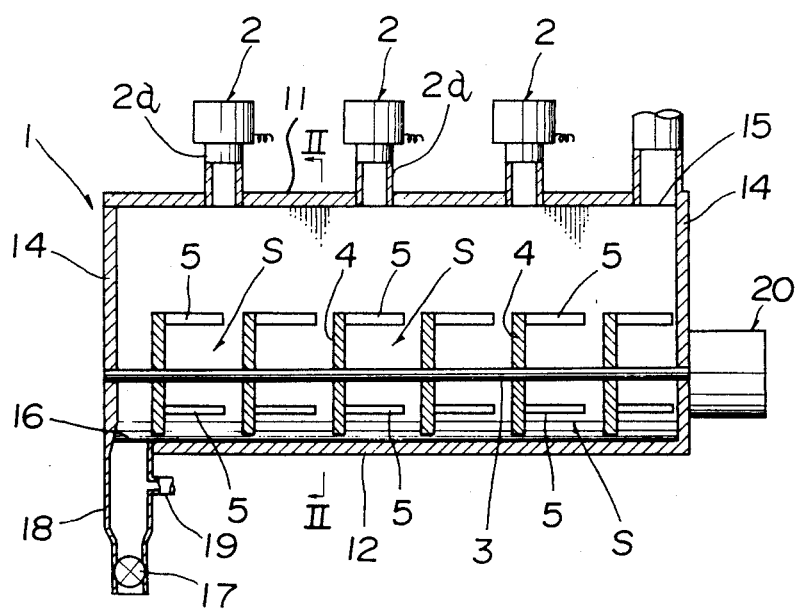
FIG. 1 is a schematic longitudinal sectional view of a first embodiment of a drying and crystallizing apparatus for granules of the invention.
Figure 2:
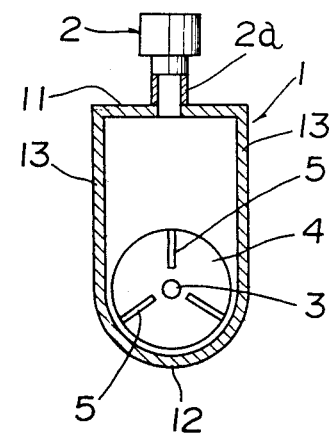
FIG. 2 is a sectional view taken along line II—II in FIG. 1.

Referring to FIGS. 1 and 2, a first embodiment of a drying and crystallizing apparatus for granules of the invention is shown, which heats, dries and crystallizes granules by a heating tank 1. The heating tank 1 comprises a top wall 11, a bottom wall 12, both side walls 13, and both end walls 14, and is formed in the shape of a rectangular parallelepiped and is sealed. A plurality of microwave units 2 provided with waveguides 2a are disposed in series on the top wall 11 so that microwaves can be radiated from the waveguides 2a into the heating tank 1. A material inlet 15 is provided at one lengthwise end of the top wall 11.

The bottom wall 12, as shown in FIG. 2, is curved downwardly in a semicircular arc, so that the heating tank 1 is substantially U-shaped in section with the bottom wall 12 and both the side walls 13. A material oulet 16 is provided at one lengthwise end of the bottom wall 12 reverse to the material inlet 15, a discharge pipe 18 provided with a rotary feeder 17 continuously discharging therethrough the granules is provided at the material outlet 16, and at the upper portion of the discharge pipe 18 and above the rotary feeder 17 is mounted a dehumidifying air feed pipe 19.

In the first embodiment in FIGS. 1 and 2, a driving shaft 3 is disposed at the center of the semicircularly bent bottom wall 12. The driving shaft 3 carries a plurality of disc-like partitions 4 for forming the plurality of partioned spaces S therebetween and across the material inlet 15 and material outlet 16. Driving shaft 3 is supported rotatably to the heating tank 1, passes through heating tank 1 lengthwise and at the lower portion thereof, projects at one end at the material inlet 15 side outwardly of the end wall 14, and rotatably connects to a driving unit 20 formed of a motor or the like.

The partitions 4 are mounted on the driving shaft 3 spaced lengthwise thereof at regular intervals and each provided with agitating vanes 5 for agitating the granules in each partitioned space S and conveying them to the adjacent partitioned space S at the material outlet 16 side. Also, the partitions 4 each have an outer diameter slightly smaller than an inner diameter of the semicircularly bent bottom wall 12, are disposed concentrically therewith, and form the partitioned spaces S between the respective adjacent partitions 4.

Figure 3:
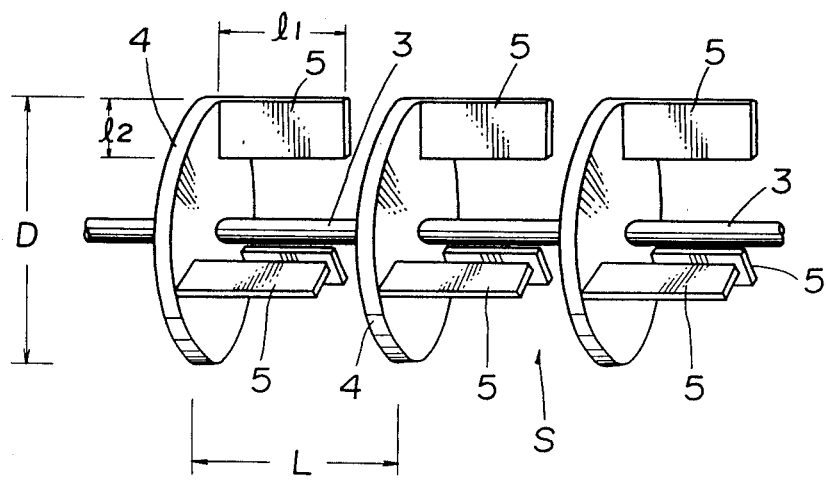
FIG. 3 is a perspective view of part of a driving shaft provided with disc-like partitions.

The agitating vanes 5, as shown in FIG. 3, are plate-like-shaped, provided at the outer periphery of each disc-like partition 4, spaced at a phase difference of 120°, and extend parallel to the driving shaft 3 and toward the material inlet 15.

The drying and crystallizing apparatus of the invention in FIGS. 1 and 2, while rotating the driving shaft 3 and partitions 4 by the driving unit 20, charges the granules into the heating tank 1 through the material inlet 15.

The granules charged in the heating tank 1, while being agitated by the rotating vanes 5, are transferred to the adjacent partitioned space S.

In addition, the granules are continuously charged into the heating tank 1 through the material inlet 15 and controlled to correspond to the transfer capacity of each partition 5 to an extent of covering the driving shaft 3 in each partitioned space S.

The granules thus agitated and transferred to each partitioned space S are radiated by the microwaves from the microwave units 2 and heated thereby.

Water content included in the granules is vaporized by heating and exhausted, together with the dehumidifying air fed from the dehumidifying air supply pipe 19, outwardly of the heating tank 1 through the material inlet 15, thereby drying or crystallizing the granules.

The rotary feeder 17 is driven to discharge the dried or crystallized granules outwardly through the material outlet 16.

The granules charged in the heating tank 1, as the described above, are stepwise transferred to each partitioned space and uniformly agitated therein and then discharged, thereby enabling variations in heating to be eliminated. Moreover, the granules agitated and sequentially transferred to the adjacent partitioned space S are reduced in variation in the residence time when they stay in the heating tank 1 so as to be heated by the microwaves.

Figure 4:
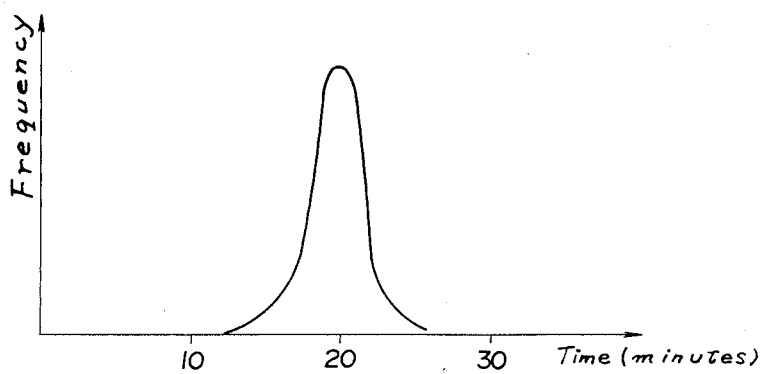
FIG. 4 is a view graph showing frequency distribution of a residence time.

Incidentally, as shown in FIG. 3, each disc-like partition 4 is 150 mm in diameter D and spaced apart at an interval of 100 mm, each agitating vane 5 is 70 mm in length $l_1$ and 300 mm in width $L_2$, so that, when granules of petrochemical resin of 3 to 5 mm in grain diameter are transferred at a speed of 60 kg per hour and the residence time of granules aims at 20 mimnutes, the frequency distribution of the residence time of granules at the material outlet 16 has been measured, thereby obtaining the result as shown in FIG. 4.

The frequency distribution of the residence time is obtained in a manner such that, while keeping an amount of granules in each partitioned space S to an extent of covering the driving shaft 3, colored granules discriminated from those to be dried are charged into the heating tank 1 at a predetermined amount at predetermined time intervals to thereby count the number of the colored granules included in the granules discharged from the material outlet 16.

As seen from the measurement result shown in FIG. 4, the frequency of discharge for the target residence time of 20 minutes is maximum.

Figure 5:
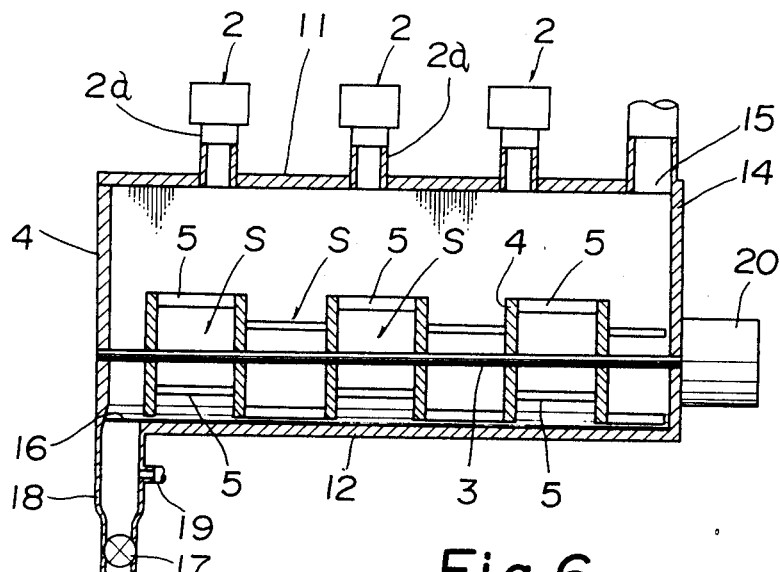
FIG. 5 is a schematic longitudinal sectional view of a modified embodiment of the first embodiment of the invention.

In addition, when the partitions 4 are increased in number to increase the partitioned spaces S, the curve of the residence time frequency distribution is made more sharp at the peak, thereby enabling a further improvement in the uniformity of the residence time of granules. Alternatively, the agitating vanes 5 may be provided at both sides of each partition 4. Furthermore, as shown in FIG. 5, the agitating vanes 5 may connect the respective adjacent partitions 4, in which frameworks are formed to improve the overall strength.

Preferably agitating vanes 5 are provided at the outer peripheral portion of each partition 4 as in the first embodiment, which vanes may be provided radially inwardly of each partition 4. Furthermore, the agitating vanes 5 are not limited in number and configuration to those illustrated in the first embodiment.

Figure 6:
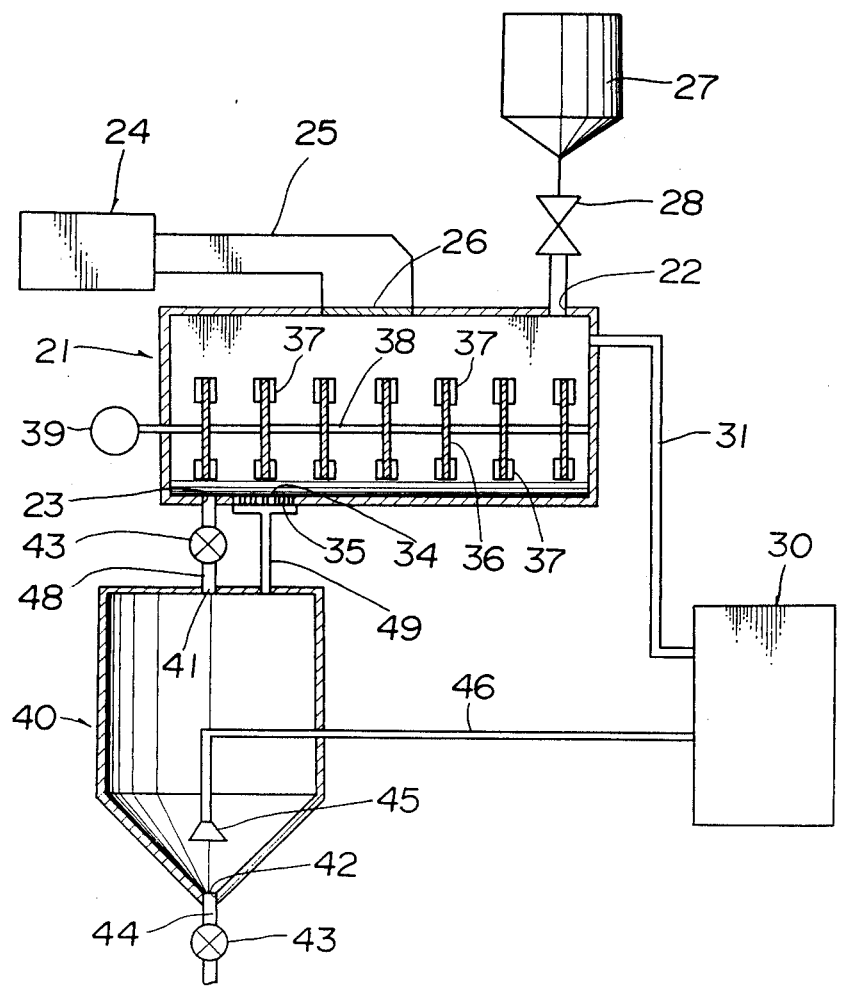
FIG. 6 is a schematic illustration of a second embodiment of the invention, in which the principal portion thereof is shown in section.

Alternatively, as shown in FIG. 6, in another preferred embodiment, a drying tank may be provided independently of the heating tank 1, so that dehumidifying air is supplied to the drying tank for drying the granules.

Referring to FIG. 6, a heating tank 21, the same as heating tank 1 in the first embodiment, is formed in the shape of a rectangular parallelepiped, has at one lengthwise side a material inlet 22 and at the other lengthwise side a material outlet 23, and forms at the top wall an opening of a wave guide 25 of a microwave unit 24, is provided at the opening with a partition 26 to thereby partition therethrough the interior of heating tank 21 from that of wave guide 25. The material inlet 22 connects with a material storage tank 27 through a valve 28. A return pipe 31 of a dehumidifying air supply unit 30 to be discussed in detail below is mounted on the upper portion of one side wall of the heating tank 21 at the material inlet 22 side.

An opening 34 is provided at the lower wall of heating tank 21 in the vicinity of the material outlet 23, and a punching plate 35 having a large number of orifices through which the granules are incapable of passing is mounted at the opening 34. Furthermore, a rotary shaft 38, on which a large number of disc-like partitions 36 provided with agitating vanes 37 are mounted, passes through heating tank 21 and is adapted to rotate by a driving unit 39, such as a motor or the like.

A sealed funnel-shaped drying tank 40 is provided at the lower portion of the system below the heating tank 21, and a material inlet 41 is provided at the upper wall of the drying tank 40. A material outlet 42 is provided at the lower end of tank 40, and a discharge pipe 44 provided with a rotary feeder 43 connects with the material outlet 42. Furthermore, a conical diffuser 45 for dehumidifying air is provided at the inside lower portion of the drying tank 40 and connects with the dehumidifying air supply unit 30 through a blast pipe 46.

In addition, the dehumidifying air supply unit 30 is provided with a heater (not shown) or the like so as to adjust the temperature of dehumidifying air blown-off into the drying tank 40.

The material outlet 23 at the heating tank 21 connects with the material inlet 41 at the drying tank 40 through a connecting pipe 48 having a rotary feeder 47.

In addition, separately from the connecting pipe 48, an air connecting pipe 49 is provided between the upper wall of the drying tank 40 and the opening 34 at the bottom wall of the heating tank 21, so that the dehumidifying air blown-off into the drying tank 40 returns to the dehumidifying air supply unit 30 through the air connecting pipe 49, heating tank 21, and return pipe 31.

The second embodiment of the drying apparatus constructed as described above dries the granules in a manner such that the rotary shaft 38 is driven by the driving unit 39 to rotate the agitating vanes 37 together with the disc-like partitions 36 so that the granules are heated by the microwaves while reducing residence time variations, and then discharged from the heating tank 21 by the rotary feeder 47 through the material outlet 23. In this case, the granules in the storage tank 27 are continuously charged into the tank 21 through the material inlet 22 to the extent that the granules are charged slightly higher than the level of rotary shaft 38 in each partitioned space S between the respective pertitions 36. Also, the microwaves from the microwave unit 24 are radiated on the granules in the heating tank 21 through the wave guide 25 to heat them up to the most suitable high temperature required for drying them with the dehumidifying air in the drying tank 40. The heated granules are sequentially discharged by the rotary feeder 47 to the connecting pipe 48 through the material outlet 23 and sequentially charged into the drying tank 40 through the material inlet 41 thereof, so that the granules are dried by the dehumidifying air which is sent from the dehumidifying air supply unit 30 and blown off through the diffuser 45, at which time the granules are dried while adjusting as necessary the temperature of dehumidifying air. In addition, the temperature of dehumidifying air may be raised or lowered.

Then, the dried granules are sequentially discharged from the drying tank 40 by the rotary feeder 43 through the material outlet 42.

Accordingly, the granules in the heating tank 21 are quickly heated by radiation of the microwaves up to the optimum temperature and then charged in the separate drying tank 40 to be dried therein by the dehumidifying air. As a result, the drying capacity of drying tank 40 corresponds to the heating capacity of heating tank 21, thereby enabling the microwave unit 24 to be operated without interrupting the microwave radiation, and also enabling its operating rate to be improved.

Alternatively, the return pipe 31 connected to the heating tank 21 in this embodiment may be open to the atomosphere. Also, the air connecting pipe 49 may alternatively be omitted so as to separately supply the humidifying air to the heating tank 21 and drying tank 40.

Although several embodiments have been described, they are merely exemplary of the invention and not to be construed as limiting, the invention being defined solely by the appended claims.

What is claimed is:

1. A drying and crystallizing apparatus for granules, comprising:
    (a) a heating tank formed in the shape of a rectangular parallelepiped having at one lengthwise side thereof a material inlet and at its other lengthwise side a material outlet,
    (b) a plurality of microwave units for radiating microwaves on said granules charged into said heating tank through said material inlet, and
    (c) an agitating unit housed in said heating tank for agitating said granules, comprising a plurality of spaced-apart disc-like partitions for providing in said heating tank a plurality of partitioned spaces between adjacent disc-like partitions across said material inlet and said material outlet, a driving shaft for supporting said partitions so as to rotate them, and agitating vanes mounted on each of said partitions so as to agitate said granules in each of said partitioned spaces and transfer said granules from one partitioned space successively into adjacent partitioned spaces in the direction of the material outlet side.

2. A drying and crystallizing apparatus for granules according to claim 1, wherein said heating tank is provided with a bottom wall having a semicircular section, each of said disc-like partitions has a diameter smaller than an inner diameter of said bottom wall, said driving shaft is disposed at the axis of said bottom wall of semicircular section, and said partitions are disposed concentrically with said bottom wall wherein a gap between said bottom wall and outer surfaces of said partitions is very small.

3. A drying and crystallizing apparatus for granules according to claim 1, wherein said heating tank is provided at the material output side with a dehumidifying air supply pipe.

4. A drying and crystallizing apparatus for granules, comprising:
   (a) a heating tank having a material inlet and material outlet,
   (b) a microwave unit for applying microwave radiation onto said granules charged into said heating tank through said material inlet,
   (c) an agitating unit housed in said heating tank so as to agitate said granules and provided with a plurality of spaced apart disc-like partitions defining in said heating tank a plurality of partitioned spaces between adjacent disc-like partitions across said material inlet and said material outlet, a driving shaft for supporting said partitions so as to rotate them, and agitating vanes mounted on said partitions which transfer said granules in a direction toward said material outlet while agitating said granules charged into said heating tank,
   (d) a drying tank for drying said granules heated in said heating tank, said drying tank being provided at its upper portion with a material inlet through which said granules are received, at its lower portion with a material outlet and at an intermediate portion with a diffuser for dehumidifying air, and
   (e) connecting means for connecting said material outlet at said heating tank with said material inlet at said drying tank.

5. A drying and crystallizing apparatus for granules according to claim 4, wherein said heating tank is provided with a bottom wall having a semicircular section, each of said disc-like partitions having a diameter slightly smaller than an inner diameter of said bottom wall and being disposed concentrically with said bottom wall.

6. A drying and crystallizing apparatus for granules according to claim 4, wherein an air connecting pipe is interposed between said drying tank and said material outlet at said heating tank, said air connecting pipe for supplying into said heating tank a part of the dehumidifying air blown off into said drying tank.

7. A drying and crystallizing apparatus for granules according to claim 4, further including a dehumidifying air supply unit, said dehumidifying air supply unit being provided at its dehumidifying air supply side with a blast pipe connected with said dehumidifying air diffuser open in said drying tank and at its air take-in, shape of side with a return pipe open in said heating tank.

* * * * *